United States Patent [19]

Hall

[11] Patent Number: 4,678,016

[45] Date of Patent: Jul. 7, 1987

[54] MACHINE AND APPARATUS FOR MAKING BASKETS

[76] Inventor: Timothy L. Hall, R.D. #10, Box 176, Meadville, Pa. 16335

[21] Appl. No.: 902,788

[22] Filed: Sep. 2, 1986

[51] Int. Cl.[4] .................................... B23J 1/00

[52] U.S. Cl. .................................... 147/48; 217/122

[58] Field of Search .................... 139/11; 217/122; 147/48

[56] References Cited

U.S. PATENT DOCUMENTS

| | | | |
|---|---|---|---|
| 124,231 | 3/1872 | Tower | 217/122 |
| 763,580 | 6/1904 | Walker | 217/122 |
| 1,311,086 | 7/1919 | O'Loughlin | 217/122 |
| 1,933,879 | 11/1933 | Thayer | 147/48 |
| 2,265,820 | 12/1941 | Scanlan | 147/48 |

*Primary Examiner*—Henry S. Jaudon
*Attorney, Agent, or Firm*—Charles L. Lovercheck; Wayne L. Lovercheck; Dale R. Lovercheck

[57] ABSTRACT

A support for a basket during weaving is disclosed. The support has a frame made up of a first column and a second column. A basket mold is supported on the first column and a foam rubber pad is rotatably supported on the second column. A hydraulic cylinder has a piston rod attached to the foam pad. The pad holds a basket bottom, having warp and weave members nailed to the basket bottom, to the basket mold. The basket can than be woven, the top handle installed and the completed basket removed from the mold.

5 Claims, 10 Drawing Figures

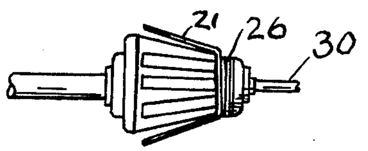
FIG. 6
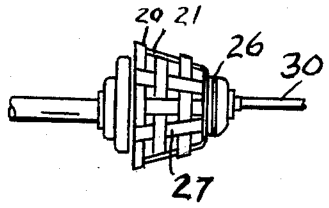
FIG. 7
FIG. 8
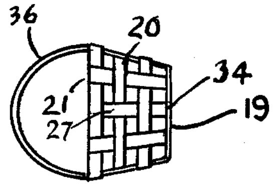
FIG. 9
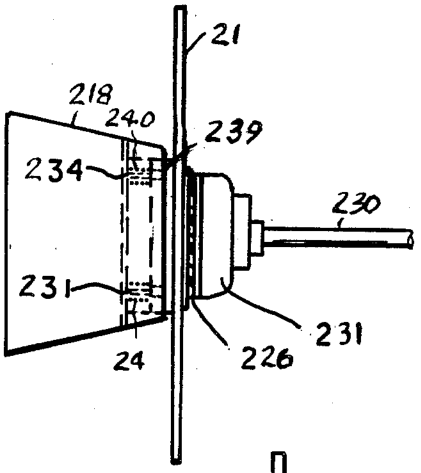
FIG. 10
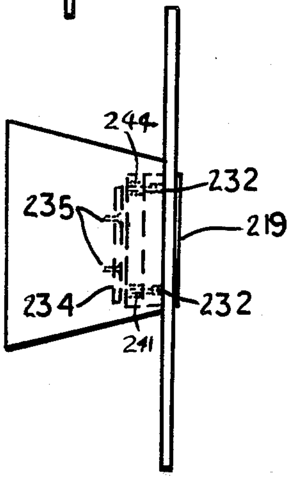

MACHINE AND APPARATUS FOR MAKING BASKETS

BACKGROUND OF THE INVENTION

This invention relates to a basket making machine and method and more particularly to a machine for supporting a basket while the basket is being woven and manufactured.

REFERENCE TO PRIOR ART

Previous basket making machines utilized a drive mechanism for rotating the basket during manufacture. For example, U.S. Pat. No. 1,933,879 to Thayer shows such a devise. U.S. Pat. No. 2,322,363 to James, shows a machine for forming the basket warp and weave around a mold with an electric motor, belt 12 and pulley 11 for operating a gear reduction unit to move the clamping mechanism.

Applicant has provided a simple efficient clamping mechanism to firmly clamp the basket components in place for convenience in weaving them.

OBJECTS OF THE INVENTION

It is an object of the invention to provide an improved basket weaving machine.

Another object of the invention is to provide an improved support for suporting basket components on a basket mold for weaving.

Another object of the invention is to provide an improved basket mold and method for holding basket components in place during the weaving procedure.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWINGS

FIG. 6 is a view of the components shown in FIG. 5 with the clamping pad in place.

FIG. 7 is a view of the basket and machine parts shown in FIGS. 4 and 5 with the basket partly woven.

FIG. 8 is a side view of the completed basket.

FIG. 9 is a side view, partly in cross-section of another embodiment of the invention.

FIG. 10 is a side view similar to FIG. 9.

DETAILED DESCRIPTION OF THE DRAWINGS

Figure 1:
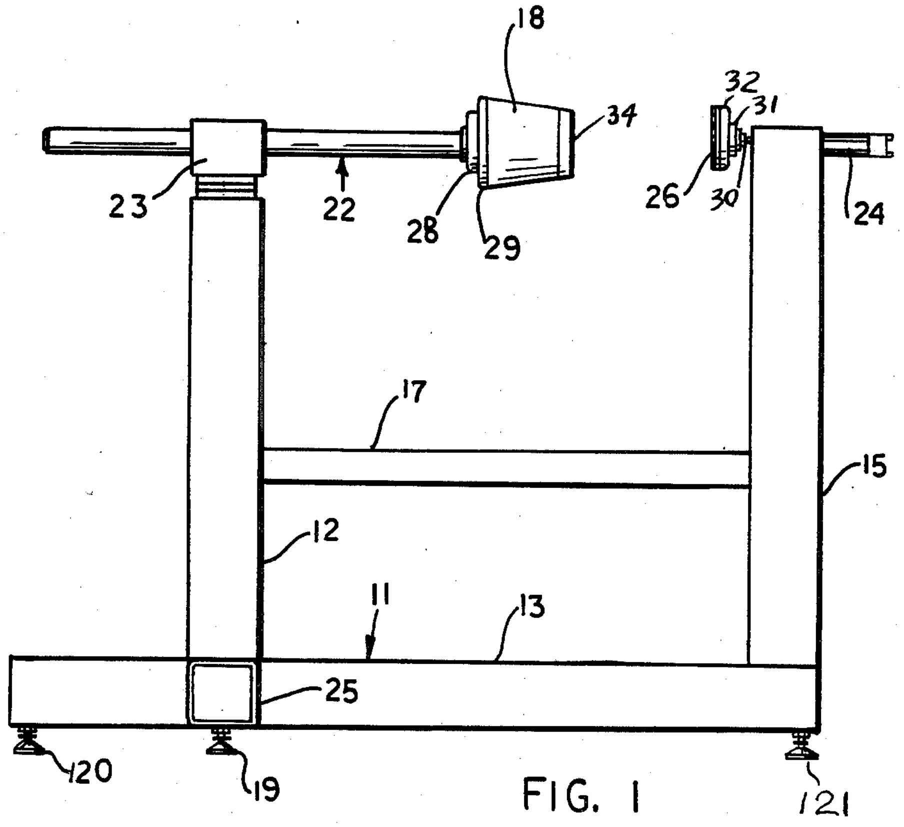
FIG. 1 is a side view of a machine for supporting basket components during a weaving operation.
Figure 2:
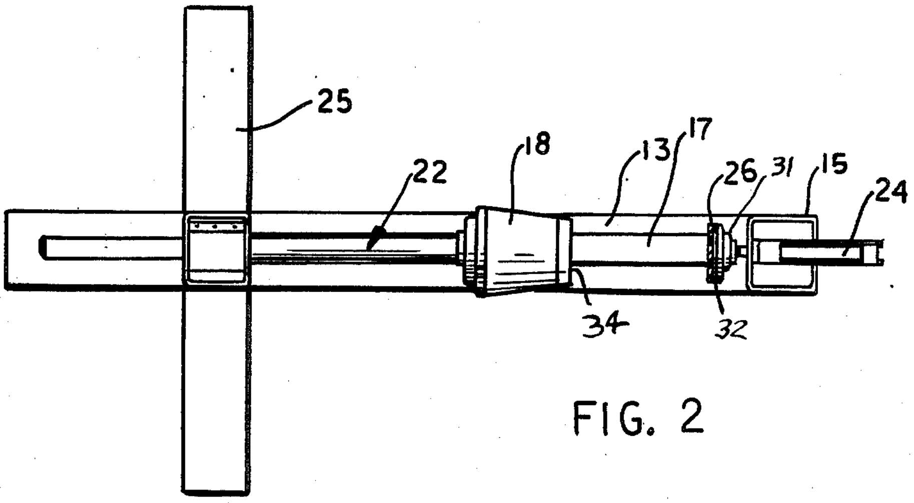
FIG. 2 is a top view of the machine shown in FIG. 1.

Now with more particular reference to the drawings, referring to the embodiment of the invention shown in FIGS. 1 and 2, I show an apparatus for use in making baskets made up of a frame 11, having a longitudinally extending base member 13 with a column 12 extending upwardly therefrom. The pad support column 15 is supported in spaced relation to column 12. Column 12 is connected to pad support column 15 by means of a tubular support 17 which holds the column 12 and pad support column 15 in rigid spaced relation to one another.

The laterally extending leg 25 is fixed to base 13 adjacent the column 12 and extends laterally therefrom. Leveling pads 19, 120 and 121 are fixed to the base frame 13 and the end of leg 25, respectively, and they can be adjusted up and down to level the frame.

The support shaft 22 is adjustably supported in the bracket 23 which is fixed to the upper end of the column 12. The basket mold 18 is supported on the inner end of the support shaft 22 by means of the flange bearing 28 which is fixed to the support plate 29. A clamping means made up of piston rod 30 in hydraulic cylinder 24 supports the flange bearing 31 to which is attached to pad support plate 32. Foam rubber pad 26 is fixed to pad support plate 32.

In operation, the bottom board 19 has warp members 21 and 27 nailed to it. The weave and warp members 20 and 21 can be one on either side of the bottom board 19, or they can both be on the same side, but they will be nailed to the bottom board by means of nails 33. When the weave and warp members are attached to the bottom board 19, the bottom board 19 is brought into contact with the end 34 of the basket mold 18 and the piston rod 30 is extended bringing the rubber pad 26 into engagement with the weave members 20, holding the bottom board 19 snugly to the end 34 of the basket mold 18. The operator can then bend the warp and weave members toward the column 12 to the position shown in FIG. 6. Then the operator can weave or interlace the weave members 20 with the first warp members 21 and second warp member 27 to form the side portions of the basket, as shown in FIGS. 7 and 8 and the handle 36 can be put in place and fixed to the bottom board 19 as shown in FIG. 8. The operator can then move the rubber pad 26 away from the basket, the basket can be removed and the basket will be completed.

Figure 3:
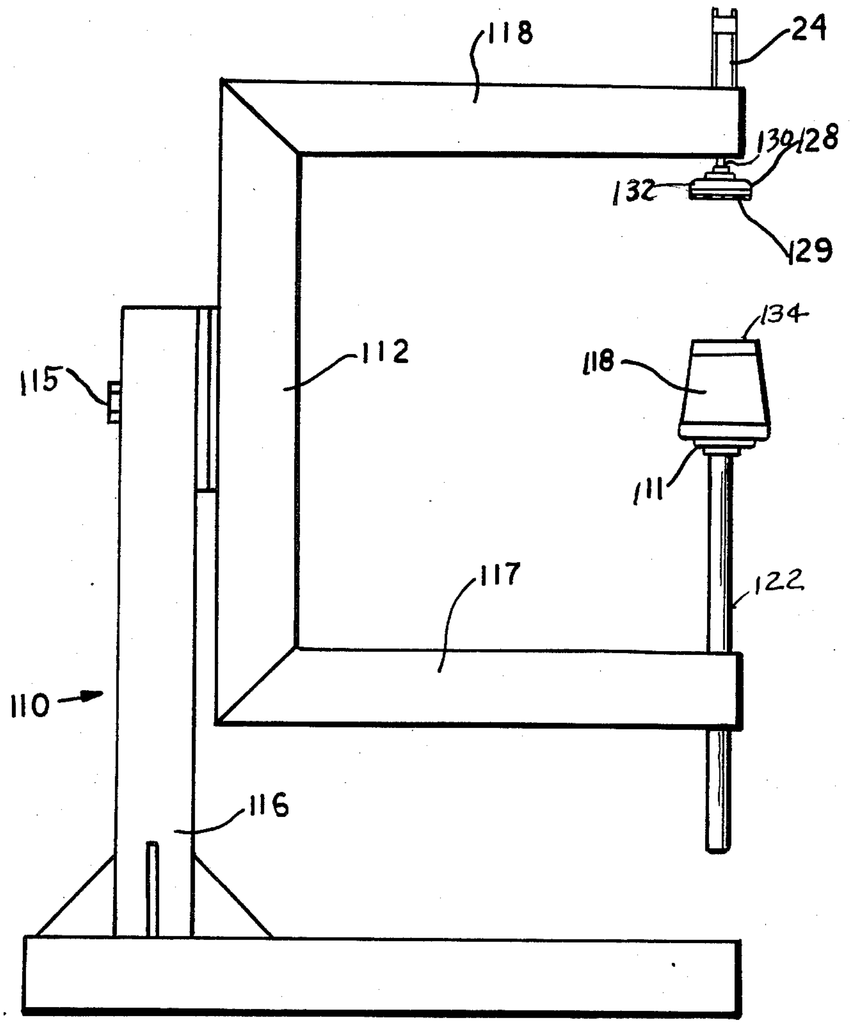
FIG. 3 is a side view of another embodiment of the invention.
Figure 4:
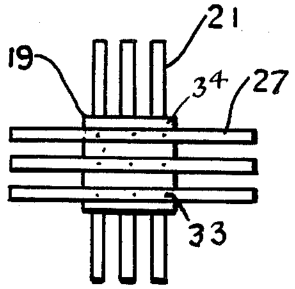
FIG. 4 is a view of the bottom of the components of a basket assembled prior to placing them in the machine.
Figure 5:
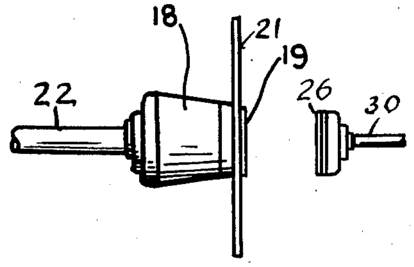
FIG. 5 is a side view of the basket components shown in FIG. 4 in position on the basket mold prior to clamping.

In the embodiment of the invention shown in FIG. 3 and FIG. 4, a machine is shown generally at 110 with upright upwardly extending column 112 supported on the vertical member 116 by means of a bolt 115 which extends through the column 112 and through the vertical member 116. The column 112 has spaced support members 117 and 118 fixed to it. Support member 117 has basket support shaft 122 supported on it. Flange bearing 128 is fixed to the piston rod of cylinder 130. Flange bearing 128 has a pad support plate 132 and a rubber pad 129 similar to the pad 26 in FIG. 1.

The operation of the apparatus shown in FIG. 3 is identical to that of the apparatus shown in FIGS. 1 and 2, with the exception that in the invention shown in FIG. 3, the vertical position of the basket being woven can be adjusted by swinging the frame about the bolt 115.

In the embodiment of the invention shown in FIGS. 9 and 10, a spring loaded basket mold 218 is provided wherein the basket mold is divided into two separate parts, namely, mold 218 and mold bottom 239. The mold bottom 239 is slidably supported on studs 231 and 234. Springs 240 and 241 are disposed between mold part 218 and mold bottom 239 and urge the mold bottom 239 away from mold part 218. When rubber pad 226 is forced into place against the mold bottom 239, the mold bottom 239 is held to the mold 218. Guide pins 232 guide the mold bottom 239 into position compressing the springs 240 and 241 between mold 218 and part 235.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A machine for use in making a basket comprising a basket mold and a frame,
a basket mold on said frame,
a support shaft on said frame supporting said basket mold,
said basket mold having an end,
clamping means comprising a hydraulic cylinder having a piston and a piston rod,
said piston rod being supported on said frame,
a first flange bearing supported on said piston rod,
a second flange bearing supporting said piston rod,
a pad support on said piston rod,
a foam rubber pad on said pad support,
hydraulic means for moving said piston rod toward said basket mold for urging into position and securing a basket bottom to said basket mold end whereby said basket bottom is supported between said foam rubber pad and said mold.

2. The machine recited in claim 1 wherein said frame comprises a longitudinally extending member having a first column and a second column supported thereon in spaced relation to each other and extending upwardly therefrom,
said basket support being supported on the upper end of said first column and said hydraulic cylinder being supported on said second column.

3. A method of making a basket by, providing clamping means, a basket mold having the shape of the inside of a finished basket and having a bottom,
providing a basket bottom and warp and weave members,
including the steps of nailing said warp members to said basket bottom,
clamping said bottom to the bottom of said basket mold with said warp members supported thereon,
bending said warp members around said mold,
interlacing said weave members with said warp members,
and fastening a band to the upper ends of aid warp members,
removing said basket from said mold and attaching a handle to said basket.

4. The method recited in claim 3 wherein said clamping means has a foam pad thereon for engaging the bottom of said basket.

5. The machine recited in claim 1 wherein said frame comprises a first column, a V-shaped member having a first leg and a second leg and an intermediate member,
said first leg having a first end, a second end and an intermediate part,
said second leg having a first end, a second end and an intermediate part,
said intermediate member having a first end, a second end and an intermediate part,
said first end of said first leg being connected to said first end of said intermediate member,
said first end of said second leg being connected to said second end of said intermediate member holding said first leg and said second end of said V-shaped member in spaced parallel relation to one another,
pivot means supporting said intermediate part of said first column on said intermediate part of said second column.

* * * * *